Figure 1:
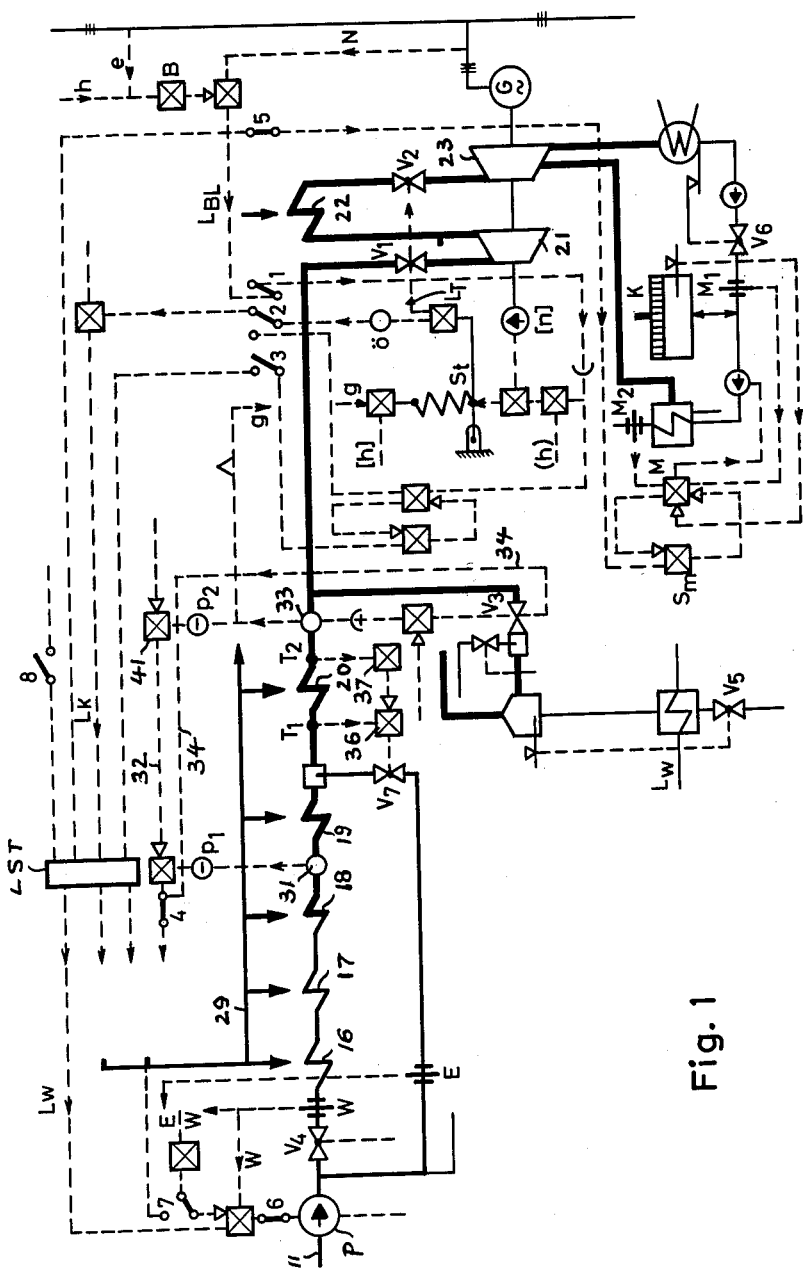

United States Patent Office 3,089,308
Patented May 14, 1963

3,089,308
REGULATING SYSTEM FOR STEAM POWER PLANTS WITH FORCED-FLOW BOILERS
Kurt Halle, Erlangen, Germany, assignor to Siemens-Schuckertwerke Aktiengesellschaft, Berlin-Siemensstadt, Germany, a corporation of Germany
Filed June 28, 1960, Ser. No. 39,407
Claims priority, application Germany July 3, 1959
9 Claims. (Cl. 60—106)

My invention relates to the regulation of power plants equipped with forced-flow steam boilers of the "once-through" or "series" type in which the feed water is heated, evaporated and the generated steam superheated in a single pass through the tube system of a drumless boiler.

In a more particular aspect, my invention relates to a regulating system which provides for regulation of the boiler heat, for example a regulation of the fuel supply and of the combustion-air supply, separately from another regulation of the flow of working medium, namely water and steam, and in which further the supply of the working medium to be evaporated is regulated in dependence upon the steam quantities required by the particular load conditions of the plant. Such regulating systems are disclosed in my copending application Serial No. 751,751, filed July 29, 1958, entitled Regulating System for Steam Power Plants With Once-Through Boilers, assigned to the assignee of the present invention. In a system of this type, a comparator continuously compares measuring values indicative of the quantities to be evaporated with measuring values derived from the actually evaporated quantities of working medium.

In order to supply the comparator with the just-mentioned measuring values required for the quantitative comparison, one generally proceeds by providing respective quantity-measuring diaphragms in the water-carrying and the steam-carrying boiler portions, thus continuously sensing and measuring the throughput of liquid and steam. In some cases, however, such measuring diaphragms are undesirable because they involve a loss in pressure. Furthermore, difficulties are often encountered in deriving an exact measuring value from the throughput quantity in the steam-carrying portion of the boiler. Such difficulties increase with increasing pressure and temperature values of the working medium. In many cases it is necessary to impress corrective magnitudes upon the measuring value in order to eliminate or minimize any measuring errors occurring during different operating conditions of the plant. Such measuring errors may be inevitable when the steam conditions of the plant change, and may result in faulty regulating signals resulting from the comparison of the water and steam flow quantities.

It is an object of my present invention to improve a regulating system of the above-mentioned type toward reducing or virtually eliminating the mentioned shortcomings.

To this end, and in accordance with a feature of my invention, I do away with a direct sensing of steam-quantity measuring values and simulate these values indirectly by response to other measured magnitudes, for example by deriving the simulated value from one or more control pulses. Suitable for this purpose are any measuring devices responding to a condition of the fresh steam and providing an indication of the steam throughput quantity. For example, according to more specific features of my invention, a pressure measuring device may be located at the outlet of the superheater, or load-influence pulses may be formed and may be derived, for example from the controlling oil pressure for a turbine operated by the steam generating plant, or from the position of the turbine controlling mechanical members. Suitable load-responsive pulses may also be derived from the electric power produced by operation of the turbine.

The use of steam-flow signals, at high pressures and temperatures and high power demands upon the boiler, constitutes a great expenditure particularly since often a multiplicity of steam-flow signals must be added or employed conjointly. Above all, steam-flow pulses are generally limited to fixed-pressure operation because the utilization of steam-flow signals becomes faulty under gliding-pressure operation.

During gliding-pressure operation, the turbine driven from the steam plant is operated with fully open control valves so that the operating pressure adjusts itself automatically in proportion to the turbine load. Such gliding-pressure operation is advantageous in many cases, for example in power plants operating in accordance with a given program, as contrasted to plants with frequency regulation in which, for increasing the machine power output, the boiler plant must at first be charged up accordingly. The adjustment of the machine loading to a different magnitude thus is essentially effected by boiler control exclusively. With this type of operation, the steam volume passing through the turbines at all loads is approximately constant, so that the turbine efficiency declines only slightly under partial load. There is also a saving in work to be done by the feed pumps.

Aside from gliding-pressure operation, it is also of advantage for fixed-pressure regulation, to avoid steam-quantity measurements and to derive the load-dependent signals in a different manner. Applicable as load-dependent control effect with respect to the heating power, i.e. for regulating the supply of coal or other fuel and combustion air, are the control-oil pressure of the turbine or the position of the turbine control members in the just-mentioned sense. The load-responsive control effect for regulating the feed water can likewise be derived from the control-oil pressure of the turbine or a similar magnitude. Preferably the latter control effect is not a direct one but acts indirectly through the boiler-load transmitter which serves as a device for furnishing all control signals. In this manner, the feed-water quantity can be adapted to the steam demand.

Figure 2:
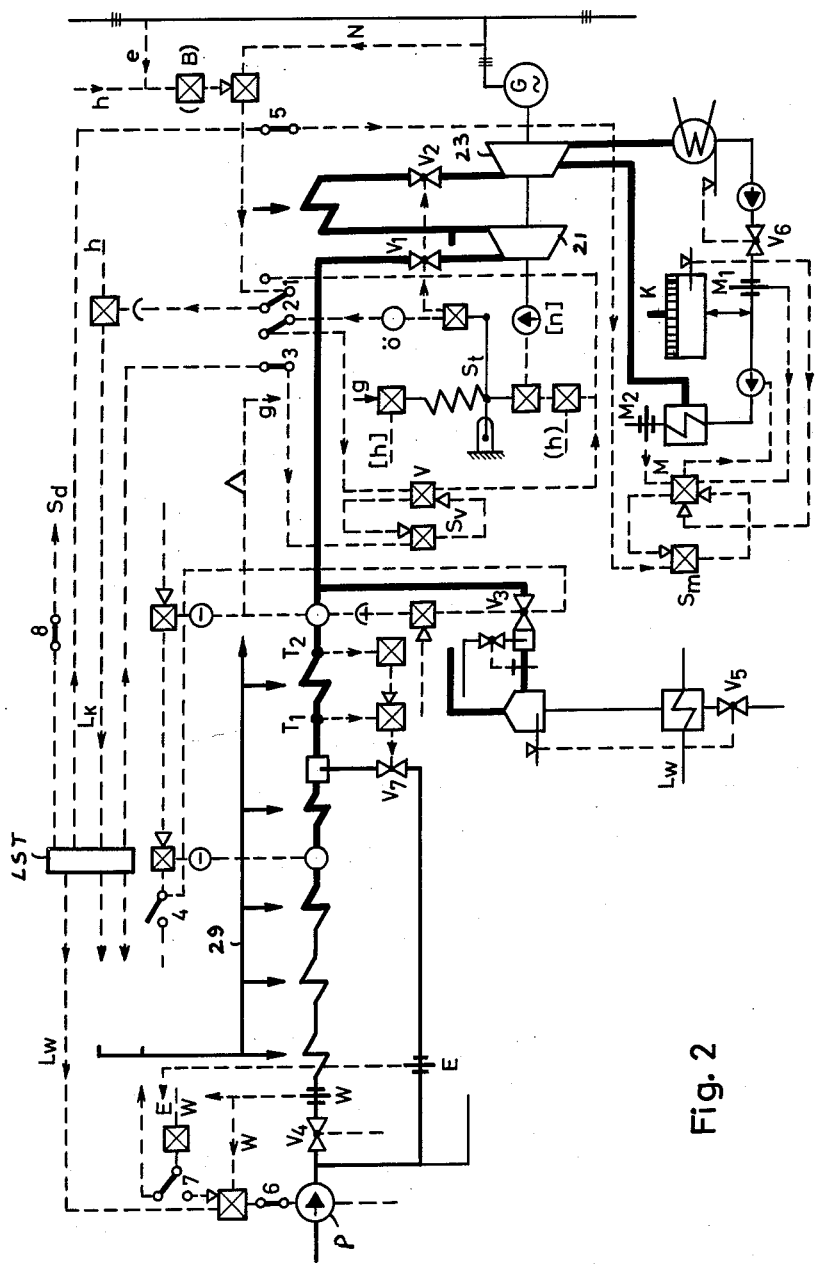

The above-mentioned and more specific objects and features of my invention will be apparent from, and will be mentioned in, the following description of the steam power plant according to the invention shown by way of example on the accompanying drawings in which FIGS. 1 and 2 illustrate schematically the flow diagrams or circuit diagrams of two different embodiments in straight-line representation. The same reference characters are employed in both diagrams for respectively similar components.

More specifically, FIG. 1 relates to a block regulation for fixed-pressure operation; and FIG. 2 relates to the same plant but set for gliding-pressure operation.

Before describing the illustrated plant in detail, a listing of some of the illustrated components will be given to facilitate orientation:

N—electric power regulator
B—load-change limiter
e—line signal
h—manual signal
n—turbine speed regulator
g—limit signals
$L_{Bl}$—block load signal
$L_T$—load signal for turbine
$L_K$—load signal for boiler
$St$—turbine control system
Ö—control-oil pressure of the turbine
V—valve-position regulator $S_v$—datum-value setting device for V
$V_1$—high-pressure turbine valve
$V_2$—medium-pressure turbine valve
$V_3$—bypass regulating valve
$V_4$—feed-water regulating valve
$V_5$, $V_6$, $V_8$—return-water regulating valves
$V_7$—injection-water control valve
K—condensate storer
M—condensate flow regulator
$S_m$—datum-value control for M
$M_1$—cold-condensate flow sensor
$M_2$—hot-condensate flow sensor
W—feed-water flow sensor
LST—load-responsive signal transmitter
$L_W$—load signal for feed water
E—injection-water flow
E/W—flow-quantity ratio of feed water to injection water
P—feed-water pump
$p_1$—steam pressure in the boiler (at the residual evaporator 18)
$p_2$—steam pressure behind the boiler
$T_1$—steam temperature behind injection valve $V_7$
$T_2$—steam temperature behind superheater 20
1–9—switches
R—return-water flow
$S_d$—datum-value adjuster for limit and outlet pressures In both illustrations, the flow system of the working medium is shown beneath, and separate from, the heat-generating firing system of the plant. The working medium, namely feed water, enters through a supply conduit 11 (FIG. 1) into the boiler plant and passes through a controllable feed pump P into a high-pressure preheater 16, thence through an evaporator 17 and a residual evaporator 18. When leaving the evaporator 18, the entire working medium is converted into steam, this being symbolically shown by representing the next-following portion of the flow system by a heavy line. The steam passes through a superheater 19, thence through a final superheater 20. The exit portion of the flow system is connected through a high-pressure turbine valve $V_1$ with a high-pressure turbine stage 21. The steam issuing from the turbine 21 passes through an intermediate heater 22 and through a medium-pressure turbine valve $V_2$ to the medium-pressure stage 23 of the turbine plant which is shown to drive a three-phase alternating-current generator G.

The firing or heat-flow system of the plant is schematically indicated at 29 in the same manner as in my above-mentioned copending application Serial No. 751,751. The fuel is assumed to enter into the heat-flow system from the left. The illustrated path of the flue gases to the smokestack, assumed to be at the right-hand end, may comprise a blower and may be designed and operative essentially in the manner explained in the copending application.

Since at fixed-pressure operation, the steam pressure determines the heat supply (heating power) in accordance with the steam demand, the heating power acts as the controlling magnitude upon which the supply of feed water at pump P is to be made dependent. The E/W ratio regulation (or a corresponding regulation) must therefore act upon the control of the feed-water pump P, but not upon the load-signal transmitter LST which controls the supply of coal (fuel) and combustion air, and also acts upon pump P and may perform other regulating operations. The load-signal transmitter LST thus serves as a common control device (rather than as a regulating member), the supply of feed water being regulated in dependence upon the injection-water/feed-water ratio, and the supply of fuel being regulated in accordance with the steam pressure, whereas the supply of air is adjusted manually or automatically in accordance with the $O_2$ or $CO_2$ demand.

It is preferable, for regulation and equalization of fluctuations in fuel supply as well as of load variations, to subdivide the steam-pressure responsive regulating operation into two component pressure-regulating steps as follows.

(a) The pressure signal $p_1$ acting upon the fuel supply is preferably taken off in the evaporator zone, for example at 31 (FIG. 1) ahead of the residual evaporator 18 or, as shown, ahead of the superheater 19. Hence the point of constant reference pressure is then located in the boiler. The pressure regulation in response to the value $p_1$ can be effected relatively rapidly. It serves for regulation of variations in coal (fuel) supply and constitutes the first phase of the pressure-regulating performance that takes place upon occurrence of load variations.

(b) The pressure regulation in response to the value $p_1$ further comprises a relatively slowly acting corrective regulation, denoted by action line 32, in dependence upon the pressure $p_2$ sensed at 33 between the boiler and the turbine. The corrective regulation in response to pressure $p_2$ acts upon the adjustment of the datum value for the pressure-responsive fuel regulator primarily controlled by the pressure $p_1$. The corrective pressure regulation in response to $p_2$ constitutes the second phase of the pressure-regulating performance occurring upon load variations. The latter phase of regulation may also be substituted by manually changing the datum value of $p_1$ to which the fuel-regulating pressure control is set.

As soon as the bypass valve $V_3$ opens, the pressure-responsive regulation acting upon the supply of coal or fuel must be discontinued, this being indicated by an action line 34 between the valve $V_3$ and the $p_1$-responsive fuel regulator. Such disconnection is necessary because then the bypass valve assumes the task of maintaining the pressure, acting under remote control or with the aid of an over-flow limit impulse. On the other hand, as soon as the bypass valve $V_3$ is again closed, the regulation responsive to pressure $p_1$ must again act upon the fuel supply.

When the steam pressure reaches a lower limit value (or by means of other limit signals), the turbine 21, 22 is relieved by the turbine-speed control system.

The steam-temperature regulation, effected by injection valve $V_7$ at 36, is dependent upon the temperature $T_1$ whose datum value is subject to corrective control at 37 in dependence upon the boiler output temperature $T_2$. Several such injection (de-superheater) devices may thus be provided.

The block power output can be determined either from the turbine-speed regulation and the speed adjustment, or from a regulation of the generated electric power, to which regulation the desired datum value is impressed either by hand or by a signal transmitted from the electric power line through a load-change limiting device. The load-change limiter serves to prevent excessively high temperature variations in the turbine.

To facilitate the compensating regulation of extreme changes in load, the storage capacity on the output side of the boiler can be utilized aside from the storage capacity at the fresh-steam side. This can be done, for example, with the aid of a temporary change in datum value of a condensate-flow regulator between a cold-condensate storer and a hot-condensate storer (feed-water tank). The control command for such change in datum value is likewise given by the load-signal transmitter LST from which all control commands are issued. There are two ways of operating with a lowered fresh-steam pressure:

(a) In the first case, the operating pressure is within the adjustable range of the datum value for the pressure regulator 41 responding to the pressure $p_2$. The desired operating pressure is adjusted manually at the datum setting device of the regulator 41. Two further adjustments are coupled therewith, namely the datum-value adjustment of the limit and blow-off pressures, and the change in characteristic for the load-responsive signal $L_K$. During such adjustments the fully automatic fixed-pressure operation remains in effect (incremental pressure operation).

(b) When the operating pressure is to be so chosen that it may also be outside of the adjusting range of the datum-pressure adjusting device, the plant must be run under gliding-pressure operation.

Since no steam-quantity signals are used for fixed-pressure operation, this regulation is well suitable for setting the plant for gliding-pressure operation. Thus, while FIG. 1 shows the plant in fixed-pressure operation, the same plant is shown in FIG. 2 set for gliding-pressure operation. This is apparent from the different settings of the selector switches 1, 2, 3, 4, 7 and 8 in the two respective illustrations. As mentioned above, steam-flow signals would be completely unsuitable for gliding-pressure operation (FIG. 2) because of the gliding fresh-steam pressure; hence such signals must be definitely avoided. During gliding-pressure operation, the pressure is of no interest whatsoever as far as regulating quantities are concerned. Consequently, a pressure regulation having a load-dependent datum value is also to be avoided.

While during fixed-pressure operation (FIG. 1) the fresh-steam pressure is constant and the control oil pressure for the turbine (valve positions of $V_1$, $V_2$) is variable in dependence upon the instantaneous load, the conditions are reversed during gliding-pressure operation during which the fresh-steam pressure is varied in dependence upon the load while the plant is operating with a constant turbine-control oil pressure (constant valve positions $V_1$, $V_2$). Consequently, for gliding-pressure operation, the steam-pressure responsive regulation is to be disconnected at switch 4. However, according to the particular load, the datum value of the limit and blow-off pressures must be correspondingly adjusted, this being done by the load-signal transmitter LST serving as a common control unit.

As mentioned, during fixed-pressure operation, the heating power (heat supply) required for the steam demand, is the critical regulating magnitude. During gliding-pressure operation, which is tantamount to operation with a pre-pressure regulator at the turbine, the quantity of feed water controlled by the load-signal transmitter LST is the determining pilot magnitude for the purpose of regulation. Consequntly, in contrast to fixed-pressure operation, it is necessary for gliding-pressure operation to have the $E/W$ ratio regulation act upon the supply of fuel instead of upon the supply of feed water, this being taken care of by correspondingly setting thte selector switch 7. The supply of fuel and the supply of water are not dependent upon any other regulatory control (for example in dependence upon the steam pressure) during gliding-pressure operation. Of course, gliding-pressure operation is less suitable than fixed-pressure operation for the compensating regulation of load variations. If extreme load variations are to be coped with under gliding-pressure operation, particular storage possibilities must be utilized. For example, the storage capacity of the boiler at its outlet side can be utilized for this purpose; and this can be done, for example, by temporarily changing the datum value for a condensate-flow regulation.

As a rule, when during gliding-pressure operation the plant is run with a fixed turbine-valve adjustment ($V_1$, $V_2$), the storage capacity in the fresh-steam portion of the boiler is not utilized but may even impede the compensating regulation of the load variation. However, with gliding-pressure operation, it is nevertheless possible to utilize the storage capacity of the boiler in its fresh-steam portion by providing the position regulator of the turbine valves $V_1$, $V_2$ with means that temporarily vary the datum value of the valve regulator (at $St$) under control by the load-signal transmitter LST in the event of load variations, so that the datum value subsequently returns gradually to the normal valve-position datum value. Consequently, the turbine valves, in the event of load variation, participate in the regulating action to a selectable degree and resume the normal valve-opening position only at constant load. For thus regulating the valve position, the control-oil pressure Ö for the turbines may be employed.

The power output (block power) of the boiler plant is controlled through the boiler-load transmitter either by manual adjustment or by means of an electric power regulation that may respond to a control signal from the power line energized by the turbine-driven generator as well as to manual adjustment. In some cases, the load-variation limiter can be dispensed with for gliding-pressure operation because then an excessive temperature change in the turbine is hardly possible.

Under gliding-pressure operation, too, a lower limit-pressure signal can be transmitted to the turbine-speed regulator. The datum value of this speed regulation is adjusted in accordance with the particular load, i.e. in dependence upon the load-signal transmitter, together with the other datum values that determine the limit and blow-off pressures.

It will be understood that it is possible at any time to run the plant with the same regulating devices either for gliding-pressure or fixed-pressure operation merely by activating or disconnecting the steam-pressure responsive regulation with the aid of a few switching operations. Plants according to the invention also afford the possibility of activating or disconnecting individual regulating operations, as may be desired. For example, when operating under fixed pressure, the change in datum value of the condensate flow regulation can thus be selectively put into and out of action, or when operating with gliding pressure, the turbine-valve position regulation, including the change of its datum value, can thus be rendered active and inactive.

I claim:

1. In a steam power plant comprising a forced-flow boiler having a firing system and a once-through flow system for working medium to be evaporated and superheated, the combination of a regulating system for regulating the supply of working medium in accordance with the steam output required by varying operating conditions of the plant, said regulating system comprising first control means connected with said firing system for controlling the heat upply of the boiler, second control means operable independently of said first control means and connected with said flow system for controlling the supply of working medium to the boiler, a comparator connected to said first and second control means for controlling them in dependence upon a first pilot magnitude indicative of the liquid quantity to be evaporated and upon a second pilot magnitude indicative of the generated steam flow quantity, and pilot means connected to said comparator for furnishing said second magnitude, said pilot means being independent of the steam flow of said boiler and having load-condition responsive means for indirectly simulating the amount of steam quantity.

2. A steam power plant according to claim 1, comprising a load-signal transmitter for issuing computed load-responsive signals, and said pilot means being connected to said transmitter for response to said signals.

3. A steam power plant according to claim 1, comprising pressure-responsive sensing means in the steam-carrying portion of said once-through flow system, said control means of said firing system having separate control devices for fuel supply and combustion air respectively, said pressure-responsive sensing means being connected to said fuel-supply control device for corrective control of the latter, and said air supply device and said system for regulating the supply of liquid working medium being independent of said sensing means.

4. In a steam power plant according to claim 3, said pressure sensing means having a first member located at a given point in the steam-carrying portion of said once-through flow system to provide a constant-pressure reference, and said sensing means further comprising a second pressure-responsive member located at the steam exit portion of said flow system and connected with said first member for correctively controlling the datum value of said sensing means.

5. A steam power plant according to claim 1, comprising a prime mover connected to said once-through flow system to be operated by the generated steam, control means for controlling the operation of said prime mover, said operation control means being connected to said pilot means so as to form part of said load-condition responsive means.

6. A steam power plant according to claim 5, comprising an electric generator connected to said prime mover to be driven thereby, said load-condition responsive means being connected to said generator to be controlled by the electric load of said generator.

7. A steam power plant according to claim 1, comprising selectively adjustable switching means for setting the plant to fixed-pressure operation and gliding-pressure operation respectively.

8. A steam power plant according to claim 3, comprising switching means connected with said pressure-responsive sensing means for rendering it active and inactive respectively.

9. A steam power plant according to claim 5, comprising a hot-condensate storer and a cold-condensate storer connected to said prime mover, and a condensate-flow regulator having means for temporarily varying the datum value of said latter regulator.

References Cited in the file of this patent
UNITED STATES PATENTS

| | | |
|---|---|---|
| 1,975,086 | Dickey | Oct. 2, 1934 |
| 1,975,104 | Junkins | Oct. 2, 1934 |
| 2,081,948 | Michel et al. | June 1, 1937 |
| 2,106,346 | Gleichmann | Jan. 25, 1938 |
| 2,170,348 | Dickey | Aug. 22, 1939 |
| 2,170,350 | Hardgrove | Aug. 22, 1939 |
| 2,243,944 | Donaldson | June 3, 1941 |
| 2,356,533 | Riedel | Aug. 22, 1944 |
| 2,668,915 | Dickey | Feb. 9, 1954 |
| 2,962,865 | Buri | Dec. 6, 1960 |